3 Sheets--Sheet 1.

THOMAS C. CRAVEN.

Improvement in the Manufacture of Cotton-Gin Saw-Teeth.

No. 126,875. Patented May 21, 1872.

Witnesses
Thomas C. Craven, Inventor,
By J. A. Curtis, Atty.

3 Sheets--Sheet 2

THOMAS C. CRAVEN.

Improvement in the Manufacture of Cotton-Gin Saw-Teeth.

No. 126,875. Patented May 21, 1872.

Witnesses,

Thomas C. Craven, Inventor,
By J. A. Curtis, Atty.

3 Sheets--Sheet 3.

THOMAS C. CRAVEN.

Improvement in the Manufacture of Cotton-Gin Saw-Teeth.

No. 126,875. Patented May 21, 1872.

Witnesses. Thomas C. Craven, Inventor,
By F. A. Curtis, Atty.

UNITED STATES PATENT OFFICE.

THOMAS C. CRAVEN, OF NORTHAMPTON, ASSIGNOR TO JOHN W. LABAREE, OF SPRINGFIELD, MASSACHUSETTS.

IMPROVEMENT IN THE MANUFACTURE OF COTTON-GIN SAW-TEETH.

Specification forming part of Letters Patent No. 126,875, dated May 21, 1872.

*To all whom it may concern:*

Be it known that I, THOMAS C. CRAVEN, of Northampton, in the county of Hampshire and State of Massachusetts, have invented a new and useful Improvement in Tools for the Manufacture of Cotton-Gin Saws; and I do hereby declare that the following is a full, clear, and exact description thereof, reference being had to the accompanying drawing making a part of this specification, and to the letters of reference marked thereon, in which—

Figure 1:
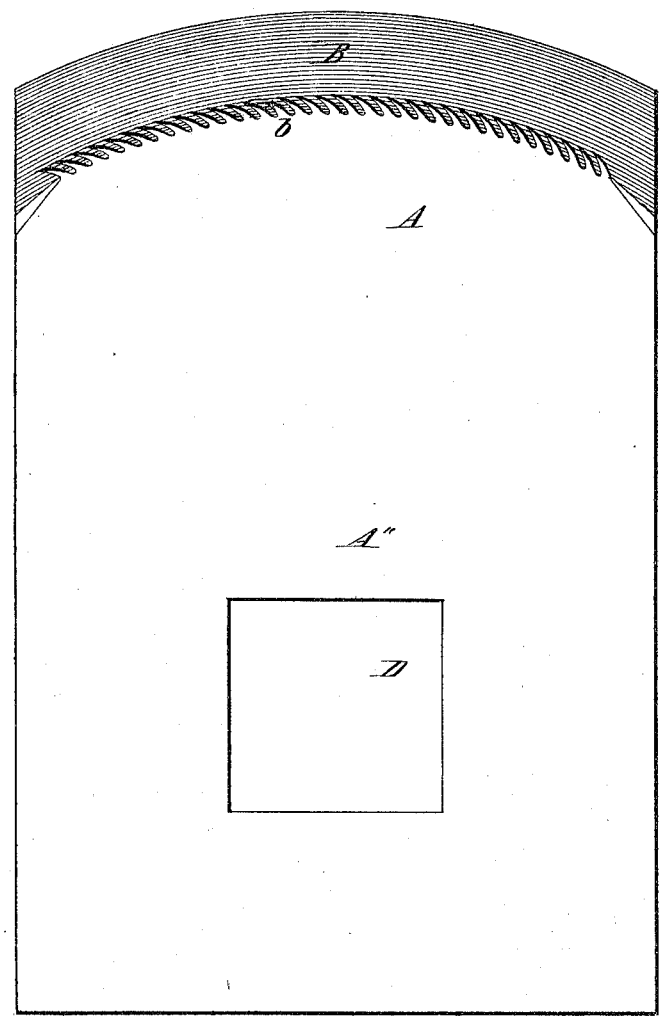
Figure 3:
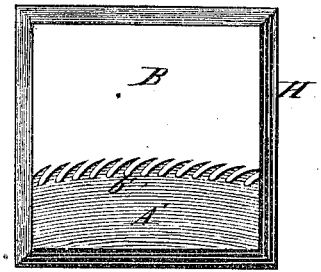
Figure 4:
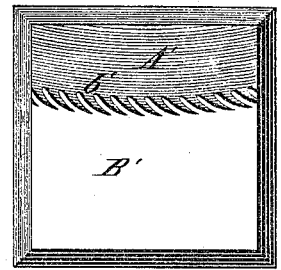
Figure 2:
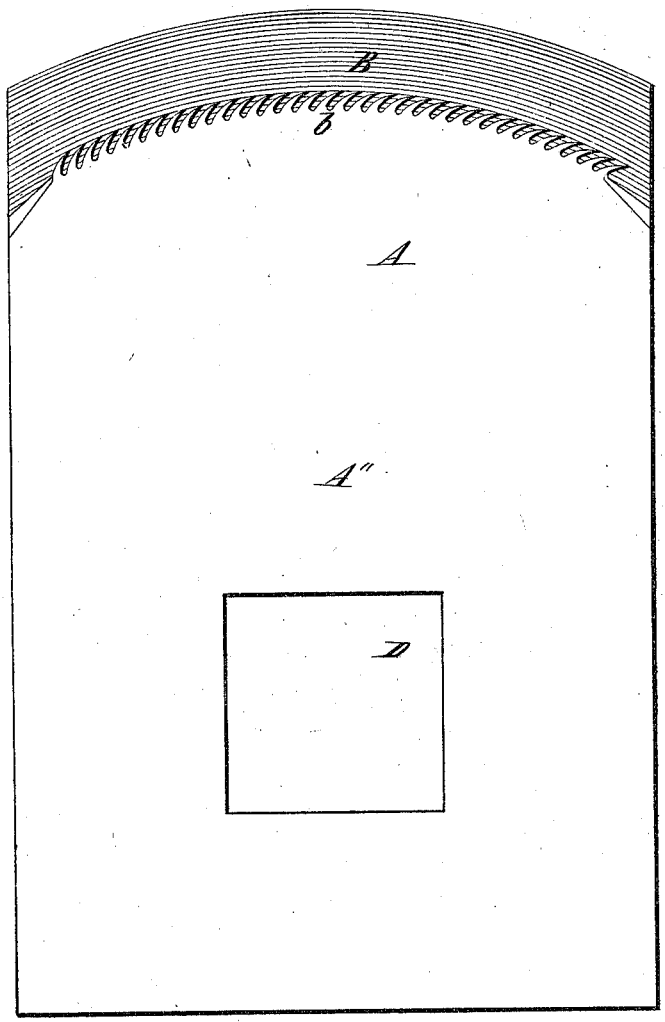
Figure 5:
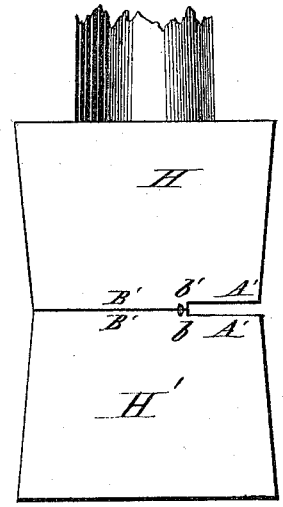
Figure 6:
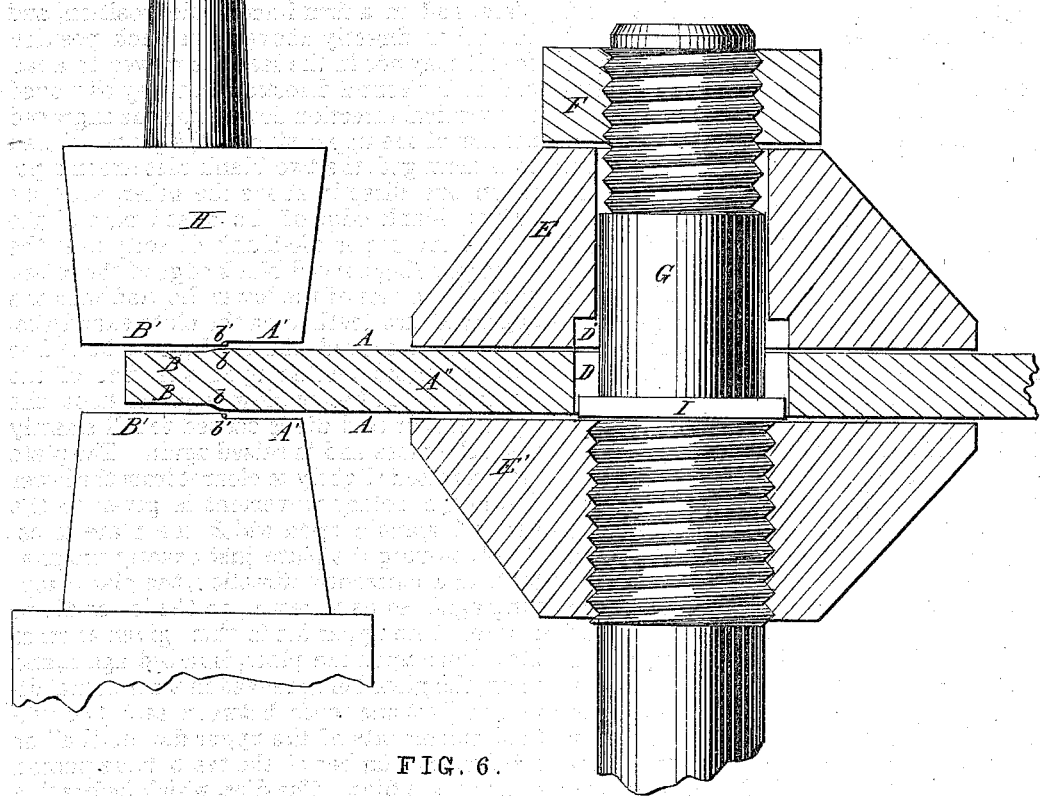

Figure 1 represents the plan view of one side of the impression-plate. Fig. 2 represents a reverse plan view of the same; Fig. 3, the face of the upper die. Fig. 4 shows the face of the lower die. Fig. 5 represents the position of both dies, as they are set in the machine and closed, in the process of making the teeth of a saw; and Fig. 6 represents the impression-plate in position, and the dies also, in the process of giving the impression of the teeth from the plate to the dies.

My invention relates to the construction of tools for the manufacture of cotton-gin saws, and consists of a plate upon opposite sides of which are engraved in alto-relievo the teeth of the saw, one-half the thickness of each tooth being upon one side and one-half upon the other; and all the teeth so engraved upon one side of said plate are located exactly opposite the teeth engraved upon the other side of the plate; and in order to give the greater strength to these teeth, they are located back from the edge of the plate, at such distance as to prevent any possibility of their being broken. That part of the plate at and adjacent to the base of the teeth is also raised, or made in alto-relievo, to the same degree as the teeth, while that part outside of and between the teeth is depressed, so that the plate upon each side has the appearance of one-half the thickness of a saw laid upon a flat surface.

The teeth are engraved upon the arc of a circle having its center in the plate, and of which the diameter is the same as that of the saw to be made, and a square hole is made at the center of the circle. The plate, as thus prepared, is then hardened, and is then secured upon a spindle inserted through the central square hole, resting upon a bearing or collar upon its lower side, and having a large washer and nut screwed down firmly against the upper side. Two dies, preferably of a cubical form, and having a face made to correspond with the engraved face of the plate, but with no saw-teeth made thereon, are placed, one just beneath the engraved lower face of the plate, and in a firm immovable position, and the other directly above it, in such position that it may not in the least be moved in a lateral or horizontal direction, but may be moved in a vertical direction down upon the engraved portion of the upper side of the plate. When thus arranged, the two blank dies are in a position one directly above the other, with the curved blank edge of the raised part of the face of the upper die-blank directly over the corresponding curved blank edge of the raised part of the face of the lower die, and with the engraved saw-teeth upon the plate exactly between said curved blank edges of both dies and the plate resting upon the face of the lower die. A heavy blow is given upon the upper die, or said die is caused to fall smartly upon the plate and is raised again. The plate is then raised slightly to clear it from the lower die, and a rotary movement is given to the vertical spindle upon which the plate is secured, moving the plate just exactly one saw-tooth in a horizontal direction, the plate dropping again so as to rest upon the lower die as before. The upper die is then given another blow down upon the plate, is raised again, and so on, the plate being moved in a horizontal direction just one tooth between each two vertical movements of the upper die, until all or a sufficient number of the teeth have passed between the dies. The dies, which before this have been in a soft condition, or in their ordinary state before hardening, have now, by these successive blows upon the plate, received upon their curved blank edges of the raised part of their faces the imprint of the teeth engraved upon the plate, one-half the thickness of each tooth being imprinted upon the face of the upper die, and the other half of the same tooth being imprinted exactly below it, upon the face of the lower die. If the plate be then removed from the spindle, and the upper die be brought down upon the lower one, face to face, a succession or series of recesses will be found upon the curved edges of the faces of the dies, of the exact form of the engraved teeth upon the plate, with a space between said dies upon one side, or an opening equal to double the thickness of the raised part of the face of the plate, and of about the ordinary thickness of a gin-saw. The dies are then removed and hardened, and being replaced firmly in their original position again, are ready for use.

That others skilled in the art may be able to make and use my invention, I will proceed to describe the same, and its operation, and application to use.

In the drawing, A represents a plate of steel, of proper thickness, and having the teeth $b$ engraved thereon, in the arc of a circle, of which the center of the hole D is the center. The part A, or a sufficient portion thereof inside the teeth, is raised, equal to or a little more than half the thickness of the saw to be made, above the plane of the part B; and the opposite side of the plate is prepared in exactly the same manner; the teeth on one side being exactly opposite the teeth upon the other side, so that if the metal of the part B and between the teeth were cut away, a succession of perfect teeth would be formed, each extending across from one side of the plate to the other, or its entire thickness.

These teeth are engraved back some little distance from the edges of the plate, so that when the plate is hardened, and in use, there may be no danger of breaking off the teeth, each tooth being amply protected and supported by a large body of metal at and around the base of the tooth.

A square hole, D, is made in the plate, at the center of the circle of which the teeth form the arc, and the plate is then hardened or tempered, and is to be used to make the imprint of the teeth engraved upon both sides thereof, upon the face of two blanks to be used as dies, and are prepared as follows: Fig. 5 represents the general form of both blanks, of which H is to be the upper and H' the lower die, having upon the face of each the raised part B' and the depressed or sunken portion A', corresponding in profile of surface with that of the plate, and having a curved blank edge corresponding with the curve upon which the teeth $b$ are engraved upon the plate. These blank dies are made of soft steel. The plate A is then fixed firmly upon a spindle, G, the square collar I made upon said spindle fitting up into the square hole D of the plate. A collar or washer, E, is then placed upon the spindle and a threaded nut, F, turned down firmly against the collar E, thus confining the plate A securely between the two collars E and E'. The spindle G may have an intermittent rotary movement given to it by means of a common index-plate, ratchet, or other suitable mechanism, and also a slight vertical movement. The die H' is then fixed in a firm position upon its bed, with the curved blank edge of the raised part of its face on a line with the base of the teeth engraved upon the plate, and with the plate resting upon the die-blank. The upper die-blank H is fixed in a position directly above the lower one and above the plate, its face in an exactly corresponding position with reference to the teeth upon the upper side of the plate. The dies H and H' as thus fixed cannot be moved in the least in a lateral direction, but the upper one may be moved in a vertical direction. The plate is then placed with one end of the rows of teeth just entered between the die-blanks, and the upper blank, being raised, is driven down upon the plate with a smart blow. This gives a partial impression upon both curved edges of the face of both dies, of whatever engraved and hardened teeth may be between the dies, and the blank is raised again. The spindle G is then raised slightly and a rotary movement is given to it of just one tooth in distance, or sufficient to bring the second tooth to the position which the first tooth occupied. The spindle and plate are dropped again and the upper blank is forced down smartly again upon the plate, and a partial impression of another tooth is made in the faces of the blanks, and the other partial impressions are also more finished and brought nearer to perfection; and this operation is continued until all the teeth have been passed between the blank-dies by the rotation of the spindle, or until a perfect imprint of the teeth upon the plate has been made upon the faces of the blank-dies. If now, the plate be removed and the upper die H be brought down upon the lower die, a series of recesses or cavities will be formed between the dies, representing the perfect teeth of a saw, of which the teeth upon both faces of the plate A form the model or pattern, one half the thickness of each tooth being in the upper die and the other half in the lower die. The dies are then removed and hardened, and they are then used to form and harden the teeth of gin-saws, and may be used in the same position and same machine as that in which they were made, as follows: The dies H and H' being replaced in their original position in the machine, a circular steel plate, having a central square hole of the same size as that in the plate, and having teeth of a similar form as those represented upon the plate A, but somewhat shorter and a little more full at the outer end, is placed upon the spindle in place of the plate A, the teeth resting in the cavities of the teeth in the face of the lower die. The upper die is then forced down upon the lower one by a succession of blows, while the spindle is given an intermittent rotary motion of one tooth in distance each time. The teeth in the saw, which were first formed by punching, being a little shorter, but of the full thickness of the metal at the outer end, while the engraved teeth upon the plate A are brought to a sharp point, the hammering of the dies, in being forced together, draws the metal of each tooth out into the extreme point of each cavity of the dies and forces the metal at the extreme point of the teeth more closely together, making the points of the teeth harder and more firm, while the base of each tooth, not being originally too large to fill the cavity, has only been hammered sufficiently to give the desired smoothness and form to the tooth at that part without hardening it.

Saws made by this process are found, from actual experiment, not to require any sharpening at the points of the teeth, as they wear sharp by use, the points of the teeth being so hard and fine in grain and quality as not to wear short, while the gullet or space between the teeth, at their base, being much softer and coarser in quality, will wear deeper by use, so that the tooth by constant use and wear will retain its original length and sharpness, and will even increase in length. Of course, in the hammering process, both in taking the impression of the teeth from the plate to the dies and in the manufacture of the saw, the plate or saw may be kept in one position and hammered by the dies while in that position as long as necessary, either to produce a perfect impression upon the dies or to form a perfect tooth upon the saw.

One series of teeth may be engraved upon one side of one plate and the other series for the other half of the teeth may be engraved upon another plate, and one plate be used to make the imprint of the teeth upon one of the dies by means of a weight to force the engraved teeth and die together, and the other plate be used to imprint the other die by means of a weight in a similar manner. This would be substantially the same process, but I prefer one plate with engraved teeth upon both sides of it.

Having thus described my invention, what I claim as new, and desire to secure by Letters Patent, is—

1. I claim the engraved plate, A, together with the plane-faced die-blocks H and H', for the purpose described.

2. I claim the method herein described of transferring impressions of the teeth of the plate A to the die-blocks H and H', as described.

THOS. C. CRAVEN.

Witnesses:
 T. A. CURTIS,
 CLARENCE BUCKLAND.